(12) United States Patent
Carrion et al.

(10) Patent No.: US 11,424,701 B2
(45) Date of Patent: Aug. 23, 2022

(54) METHOD FOR OPERATING A BRUSHED DIRECT CURRENT ELECTRIC MOTOR

(71) Applicant: Mahle International GmbH, Stuttgart (DE)

(72) Inventors: Juan Carrion, Alboraya (ES); Carlos Domingo, Requena (ES); Jorge Gaseo, Valencia (ES); Francisco Gonzalez Espin, Elche (ES)

(73) Assignee: Mahle International GmbH

( * ) Notice: Subject to any disclaimer, the term of this patent is extended or adjusted under 35 U.S.C. 154(b) by 0 days.

(21) Appl. No.: 17/029,031

(22) Filed: Sep. 22, 2020

(65) Prior Publication Data

US 2022/0094288 A1   Mar. 24, 2022

(51) Int. Cl.
*H02P 7/29* (2016.01)
*H02P 6/28* (2016.01)
*H02P 6/15* (2016.01)
*H02P 27/08* (2006.01)

(52) U.S. Cl.
CPC ............... *H02P 7/29* (2013.01); *H02P 6/153* (2016.02); *H02P 6/28* (2016.02); *H02P 27/085* (2013.01)

(58) Field of Classification Search
CPC .... H02P 7/29; H02P 6/153; H02P 6/28; H02P 27/085
USPC .......................... 318/811, 810, 807, 767, 727
See application file for complete search history.

(56) References Cited

U.S. PATENT DOCUMENTS

| 6,433,507 | B1 * | 8/2002 | Makaran ............... H02P 7/29 318/599 |
| 9,893,675 | B2 * | 2/2018 | Tachibana .......... G03G 15/5004 |
| 9,966,895 | B1 * | 5/2018 | Deuel .................... H02P 29/50 |
| 2007/0098373 | A1 | 5/2007 | Saito et al. |
| 2012/0200244 | A1 | 8/2012 | Otokawa et al. |
| 2015/0333675 | A1 | 11/2015 | Barbosa et al. |

FOREIGN PATENT DOCUMENTS

JP   2017 108512 A   6/2017

OTHER PUBLICATIONS

English abstract for JP-2017 108512.

* cited by examiner

*Primary Examiner* — David Luo
(74) *Attorney, Agent, or Firm* — Fishman Stewart PLLC

(57) ABSTRACT

A method for operating a brushed direct current electric motor may include receiving an input signal, determining an output duty cycle depending on the received input signal, determining an output frequency depending on the determined output duty cycle, generating a pulse width modulated output signal with the determined output duty cycle and the determined output frequency, and driving the brushed direct current electric motor via the generated pulse width modulated output signal. The input signal may indicate at least one of (i) a requested rotational speed of the brushed direct current electric motor and (ii) a requested output motor voltage to drive the brushed direct current electric motor.

15 Claims, 1 Drawing Sheet

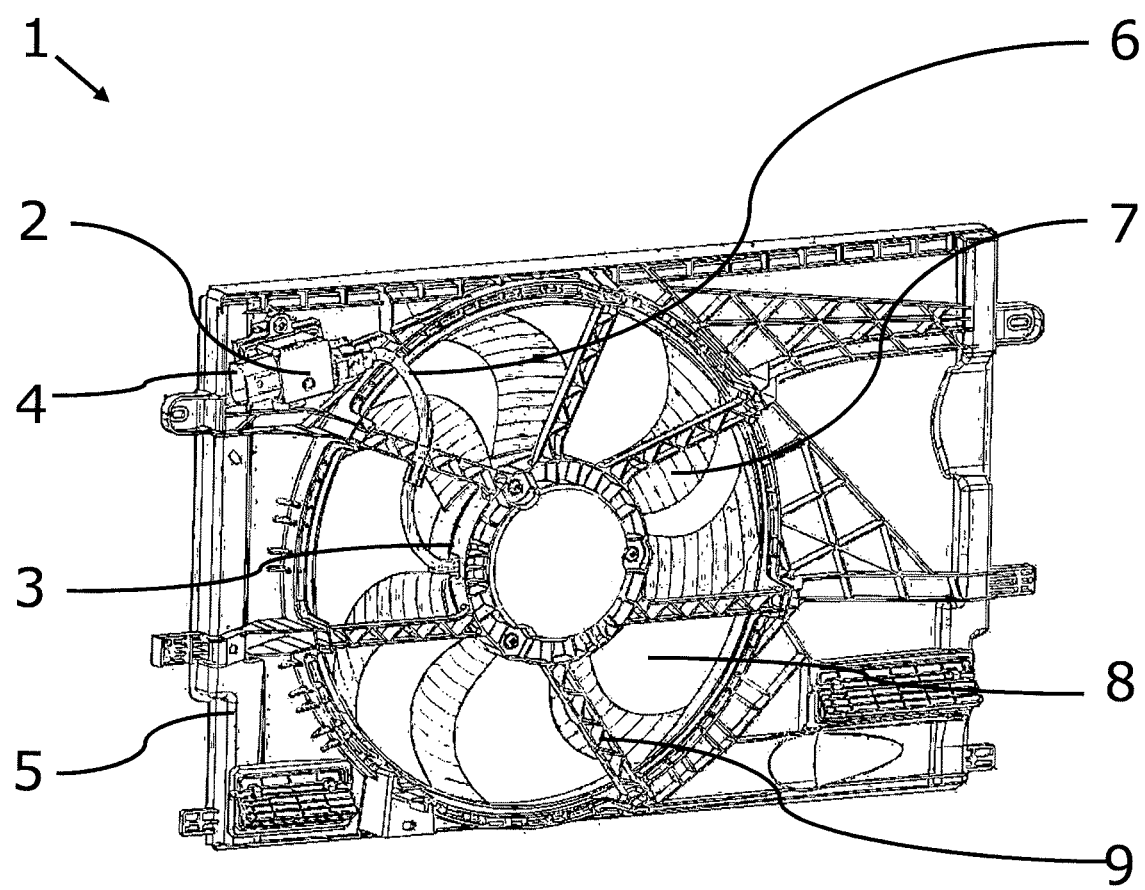

METHOD FOR OPERATING A BRUSHED DIRECT CURRENT ELECTRIC MOTOR

CROSS-REFERENCE TO RELATED APPLICATIONS

This application claims priority to European Patent Application No. EP 19198913.6, filed on Sep. 23, 2019, the contents of which is hereby incorporated by reference in its entirety.

TECHNICAL FIELD

The present invention relates to a method for operating a brushed direct current electric motor. The invention further relates to a device with a brushed direct current electric motor and a control unit which is formed and/or programmed to perform the method.

BACKGROUND

US 2012/0200244 A1 describes a driving apparatus of a sensorless brushless motor including an inverter circuit supplying a power supply voltage, of which duty ratios is variably controlled by a pulse-width modulation (PWM) method. The driving apparatus controls and drives a rotor comfortably at both low-speed range and high-speed range with high accuracy, so that a wider range of control of the rotational speed may be provided. The PWM frequencies are switched in three stages, which are normal, low-speed, and high-speed without effort and raising cost by changing the division ratio in the frequency divider circuit. A PWM generator circuit generates the PWM signal in a rectangular waveform, which may be switched to three different PWM frequencies, that is a normal PWM frequency used for normal-speed rotation of the rotor, a low-speed PWM frequency smaller than the normal PWM frequency, and a high-speed PWM frequency larger than the normal PWM frequency.

US 2007/0098373 A1 relates to a direct-current (DC) motor drive unit capable of securely starting up the motor with suppressed startup current and running the motor at the speed in accord with an external speed instruction.

US 2015/0333675 A1 describes a method for controlling pulse width modulation by a transistor based on the speed of a motor and a transfer function. The system includes a memory storing the transfer function, a transistor modulating an output current, a direct current power source providing the modulated output current to the motor via the transistor, a heat sink configured to absorb heat from the transistor and reflecting a transistor temperature, and a computing device, the computing device being configured to receive an electronic signal representing a desired speed of the motor and being configured to control the modulating input voltage, wherein the transistor produces the modulated output current at a switching frequency from the direct current power source based on the transistor temperature, and with a duty cycle based on the electronic signal as an input to the transfer function.

SUMMARY

The problem addressed by the present invention is to provide an improved method for operating a brushed direct current electric motor or at least a different method for operating a brushed direct current electric motor.

This problem is solved according to the invention by the subject-matter of the independent claim(s). The dependent claim(s) relate to advantageous embodiments.

The invention is based on the general idea to determine an output frequency depending on a determined output duty cycle in order to drive a brushed direct current electric motor.

The inventive method for operating a brushed direct current electric motor comprises the method steps:

a) receiving an input signal indicating a requested rotational speed of the brushed direct current electric motor or indicating a requested output motor voltage to drive the brushed direct current electric motor, b) determining an output duty cycle depending on the received input signal, c) determining an output frequency depending on the determined output duty cycle, d) generating a pulse width modulated output signal with the determined output duty cycle and the determined output frequency to drive the brushed direct current electric motor, e) driving the brushed direct current electric motor by the generated pulse width modulated output signal.

The term receiving may also mean reading, in particular term receiving or reading may mean a receiving of an electrical signal or reading of an electrical signal.

In an advantageous embodiment, the input signal is an input message, in particular a controller area network (CAN) input message or a local interconnect network (LIN) input message, with an input command, and in step b) the output duty cycle is determined by the input command of the input message, or the input signal is an analog signal providing an input voltage, and in step b) the output duty cycle is determined by the input voltage of the analog signal.

In an advantageous embodiment, the input signal is a pulse width modulated input signal, and that an input duty cycle of the pulse width modulated input signal is determined, and that in step b) the output duty cycle is determined by applying a predefined transfer function to the determined input duty cycle of the pulse width modu-lated input signal.

The pulse width modulated input signal may be an electrical pulse width modulated input signal. The pulse width modulated input signal may provide a voltage pulse train signal with non-sinusoidal waveform and a predefined input frequency. The requested rotational speed of the electric motor or the requested output motor voltage to drive the brushed direct current electric motor may be encoded by an input duty cycle of the pulse width modulated input signal.

The duty cycle of a pulse width modulated signal may be expressed as $D = T \cdot f \cdot 100\%$ where T is the time the signal is active (or is 'on') and f is the frequency of the pulse width modulated signal. The term duty cycle may describe the proportion of 'on' time of the signal with respect to the period of the signal with the period being the reciprocal of the frequency.

An input duty cycle of the pulse width modulated input signal of 100% may indicate that the brushed direct current electric motor has to be operated at maximal rotational speed. An input duty cycle of the pulse width modulated input signal of 0% may indicate that the brushed direct current electric motor has to stand still.

The pulse width modulated input signal may be generated by a central control unit of vehicle. This pulse width modulated input signal may be sent and/or transmitted to a control unit which may be formed and/or programmed to perform the inventive method. This pulse width modulated input signal may be received or may be read by the control unit. The control unit may be formed separately with respect to the central control unit.

The input duty cycle of the pulse width modulated input signal may be determined by the control unit which may be formed and/or programmed to perform the inventive method.

The predefined transfer function may provide a predefined correlation between the determined input duty cycle of the pulse width modulated input signal and an admissible output duty cycle to drive the brushed direct current electric motor. The predefined transfer function may be defined by a predefined analytical function and/or by a predefined numerical function and/or by a predefined look-table. The predefined transfer function may be determined by measurements and/or by simulations. The predefined transfer function may be provided by the control unit which may be formed and/or programmed to perform the inventive method. The predefined transfer function may be stored in the control unit which may be formed and/or programmed to perform the inventive method.

The output duty cycle may depend on the requested motor speed and the predefined transfer function.

An output frequency depending on the determined output duty cycle may be determined by the control unit which may be formed and/or programmed to perform the inventive method. An output frequency may be determined which may provide an optimized operation of the brushed direct current electric motor for a determined output duty cycle.

The output frequency may be changed autonomously depending on the output duty cycle. The output frequency may be changed autonomously depending on the output duty cycle by the control unit which may be formed and/or programmed to perform the inventive method.

A pulse width modulated output signal with the determined output duty cycle and the determined output frequency to drive the brushed direct current electric motor may be generated by the control unit which may be formed and/or programmed to perform the inventive method.

The brushed direct current electric motor may be driven and/or supplied with the generated pulse width modulated output signal.

The pulse width modulated input signal may be a control signal while the generated pulse width modulated output signal may be a power signal. A control signal may not provide enough electrical power to drive the brushed direct current electric motor while a power signal provides enough electrical power to drive the brushed direct current electric motor.

In an advantageous embodiment, in step c) the determined output duty cycle is compared with at least one predefined output duty cycle threshold, and if the determined output duty cycle is less than or equal to the predefined output duty cycle threshold, a first operating frequency is determined as output frequency, or if the determined output duty cycle is higher than the predefined output duty cycle threshold, a second operating frequency is determined as output frequency, wherein the first operating frequency and the second operating frequency are different.

A hysteresis loop around the output duty cycle threshold may be used to avoid rapid operating frequency changes (toggling between 1st and 2nd operating frequency) when the determined output duty cycle values range near the output duty cycle threshold.

A transition of the output frequency from the first operating frequency to the second operating frequency or a transition of the output frequency from the second operating frequency to the first operating frequency may be determined by at least one predefined hysteresis function.

The predefined hysteresis function may provide a transition of the output frequency from the first operating frequency to the second operating frequency at a first transition output duty cycle threshold which may be higher than a second transition output duty cycle threshold at which a transition of the output frequency from the second operating frequency to the first operating frequency is performed.

The determined output duty cycle may be compared with several predefined output duty cycle thresholds. In such a case, more than two operating frequencies may be available, wherein each of these operating frequencies may be determined as output frequency.

Due to the transition between at least two operating frequencies, the brushed direct current electric motor can be operated by at least two different frequencies depending on the determined output duty cycle. The switching point between the different frequencies and/or predefined output duty cycle threshold may be chosen design-specific and/or application-specific.

In an advantageous embodiment, the first operating frequency is higher than the second operating frequency. Thus, for low output duty cycles (output duty cycles lower than the predefined output duty cycle threshold) the determined output frequency is higher than the determined output frequency for high output duty cycles (output duty cycles higher than the predefined output duty cycle threshold).

An operation of a brushed direct current electric motor with pulse width modulated output signal with a high output frequency (first operating frequency) provides a reduced inrush current during motor start-up and low speeds, an increased motor useful lifetime at start-up and low speeds and/or a reduced audible noise and vibrations.

An operation of a brushed direct current electric motor with pulse width modulated output signal with a low output frequency (second operating frequency) provides reduced electromagnetic emissions (thus smaller filter can be used to comply with EMC requirements), reduced internal self-heating in the control unit (reduced switching losses) and/or an increased control unit energy efficiency.

Since a high output frequency is used for low output duty cycles, and a low output frequency for high output duty cycles, the brushed direct current electric motor stress at start-up and low speeds is reduced as well as the inrush current is minimized. Additionally, smaller filter (smaller size and lower cost) may be used to meet electromagnetic emission requirements which usually specified at high motor speeds. At high output duty cycles (high motor currents) dissipation on MOSFETs is high, so a reduced output frequency results in lower switching losses increasing the energy efficiency and may allow for a smaller heatsink and an easier thermal control.

In an advantageous embodiment, the first operating frequency is higher than 15 kHz, in particular the first operating frequency is substantially 20 kHz, and the second operating frequency is lower than 5 kHz, in particular the second operating frequency is substantially 1 kHz.

An operation of a brushed direct current electric motor with pulse width modulated output signal with an output frequency of for example 20 kHz may provide a reduced inrush current during motor start-up and low speeds, an increased motor useful lifetime at start-up and low speeds and/or reduced audible noise and vibrations.

An operation of a brushed direct current electric motor with pulse width modulated output signal with a low output frequency of for example 1 kHz may provide reduced electromagnetic emissions (thus smaller filter can be used to comply with EMC requirements), reduced internal self-heating in the control unit (reduced switching losses) and/or an increased control unit energy efficiency.

In an advantageous embodiment, in step c) the determined output duty cycle is compared with at least one predefined output duty cycle threshold region to determine the output frequency. The predefined output duty cycle threshold region may be defined by a lower output duty cycle threshold and a higher output duty cycle threshold, wherein the predefined output duty cycle threshold region may be defined to be between the lower output duty cycle threshold and the higher output duty cycle threshold. The redefined output duty cycle threshold region may include these output duty cycle thresholds.

In an advantageous embodiment, a transition of the output frequency from the first operating frequency to the second operating frequency or a transition of the output frequency from the second operating frequency to the first operating frequency is determined by at least one predefined hysteresis function.

The predefined hysteresis function may provide a transition of the output frequency from the first operating frequency to the second operating frequency at a first transition output duty cycle threshold which may be higher than a second transition output duty cycle threshold at which a transition of the output frequency from the second operating frequency to the first operating frequency is performed.

The predefined hysteresis function may be provided by the control unit which may be formed and/or programmed to perform the inventive method. The predefined hysteresis function may be stored in the control unit which may be formed and/or programmed to perform the inventive method.

In an advantageous embodiment, the at least one predefined output duty cycle threshold is between a lower duty cycle value of 55% and a higher duty cycle value of 75%, in particular between a lower duty cycle value of 60% and a higher duty cycle value of 70%, and/or the at least one predefined output duty cycle threshold region is between a lower duty cycle value of 55% and a higher duty cycle value of 75%, in particular between a lower duty cycle value of 60% and a higher duty cycle value of 70%.

In an advantageous embodiment, in step b) the predefined transfer function provides a non-linear correlation or linear correlation between the determined input duty cycle and the output duty cycle. This non-linear correlation or linear correlation may at least partly provide an increasing output duty cycle value with increasing input duty cycle value.

In an advantageous embodiment, the transfer function comprises a first region in which the output duty cycle is 0%, if the determined input duty cycle is lower than a low duty cycle threshold, and/or that the transfer function comprises a third region in which the output duty cycle is 100%, if the determined input duty cycle is higher than a high duty cycle threshold, and/or that the transfer function comprises a second region between the first region and the second region in which the output duty cycle is correlated to the determined input duty cycle. The second region may comprise the low duty cycle threshold and/or the high duty cycle threshold.

In an advantageous embodiment, the method, in particular the steps a) to e), is performed continuously and/or is performed uninterrupted during an operation of the brushed direct current electric motor. Thus, the operation of the brushed direct current electric motor can be optimized continuously during its operation and/or during its operation time.

In an advantageous embodiment, the method is a computer-implemented method and/or that the method is a method carried out by a computer. A computer may be a control unit and/or a control unit with a processing unit.

The invention further relates to a data processing apparatus comprising means for carrying out the method according to the invention as described above.

The data processing apparatus may be a data processing device and/or a data processing system.

The invention further relates to a computer program comprising instructions which, when the program is executed by a computer, cause the computer to carry out the method according to the invention as described above. A computer may be a control unit and/or a control unit with a processing unit. The computer program may be a computer program product.

The invention further relates to a computer-readable data carrier having stored thereon the computer program according to the invention as described above. The computer-readable data carrier may be a data storage section of a control unit and/or a control unit with a processing unit.

The invention further relates to a device comprising: a control unit which is formed and/or programmed to perform the method a according to the invention as described above, a brushed direct current electric motor which is controlled by the control unit, wherein the control unit is electrically connected to the brushed direct current electric motor, wherein the brushed direct current electric motor is driven by a pulse width modulated output signal generated by the control unit.

The control unit may comprise a processing unit and/or a data storage section and/or an instruction storage section.

The device may comprise a main frame on which the control unit and the brushed direct current electric motor may be arranged. The main frame may form a fan shroud. The device may comprise a wire harness. The control unit and the brushed direct current electric motor may be electrically connected by at least one electrically conductive connecting line. The control unit may comprise a plug section.

The brushed direct current electric motor may have a rotor shaft to which a propeller and/or a bladed rotor may be connected in a rotationally fixed manner.

When the brushed direct current electric motor is operated, the propeller may drive an air flow through recesses of the main frame. The device may form a fan.

The device may form a fluid conveying unit, in particular a fluid pump. A fluid pump may be a gas pump or a fluid pump. A fluid pump may be a water pump and/or a coolant pump and/or a refrigerant pump and/or a refrigerant compressor.

The device may be a traction device.

Additional important features and advantages of the invention will be appreciated from the dependent claims, the drawing and the associated description of the FIGURE with reference to the drawing.

It will be understood that the above-mentioned features and those which will be explained below may be used not only in the combination set out but also in other combinations or alone, without departing from the scope of the present invention.

Preferred embodiments of the invention are illustrated in the drawing and are explained in greater detail in the following description, wherein the same reference numerals refer to the same or similar or functionally identical components.

BRIEF DESCRIPTION OF THE DRAWINGS

The FIGURE shows a device forming a fan unit comprising a control unit, which is formed and/or programmed to perform the method according to the invention.

DETAILED DESCRIPTION

The only FIGURE shows a device 1 forming a fan unit comprising a control unit 2 which is formed and/or programmed to perform the method according to the invention. The device 1 comprises a brushed direct current electric motor 3 which is controlled by the control unit 2, wherein the control unit 2 is electrically connected to the brushed direct current electric motor 3 by an electrically conductive connecting line 6. The control unit 2 comprises a plug section 4 into which a not shown electrically conductive connecting line can be plugged in to provide an electrically and/or communicatively connection to a central control unit of a vehicle and/or to an electric power source unit of the vehicle. The device 1 comprises a main frame 5 on which the control unit 2 and the brushed direct current electric motor 3 are arranged.

The brushed direct current electric motor 3 has a not shown rotor shaft to which a propeller 7 is connected in a rotationally fixed manner. The brushed direct current electric motor 3 is driven by a pulse width modulated output signal generated by the control unit 2, wherein the propeller 7 drives an air flow through recesses 8 of the main frame 5. The recesses 8 are spaced a apart from each other circumferentially by several frame supports 9.

The invention claimed is:

1. A method for operating a brushed direct current electric motor, comprising:
   receiving an input signal indicating at least one of (i) a requested rotational speed of the brushed direct current electric motor and (ii) a requested output motor voltage to drive the brushed direct current electric motor; determining an output duty cycle depending on the received input signal; determining an output frequency depending on the determined output duty cycle; generating a pulse width modulated output signal with the determined output duty cycle and the determined output frequency to drive the brushed direct current electric motor; and
   driving the brushed direct current electric motor via the generated pulse width modulated output signal; wherein determining the output frequency includes:
   comparing the determined output duty cycle with at least one predefined output duty cycle threshold; determining the output frequency is a first operating frequency if the determined output duty cycle is less than or equal to the at least one predefined output duty cycle threshold; and determining the output frequency is a second operating frequency, which is different than the first operating frequency, if the determined output duty cycle is higher than the at least one predefined output duty cycle threshold.

2. The method according to claim 1, wherein the input signal is an analog signal providing an input voltage, and the output duty cycle is determined based on the input voltage of the analog signal.

3. The method according to claim 1, wherein:
   the input signal is a pulse width modulated input signal; the method further comprises
   determining an input duty cycle of the pulse width modulated input signal; and
   determining the output duty cycle includes applying a predefined transfer function to the determined input duty cycle of the pulse width modulated input signal.

4. The method according to claim 3, wherein applying the predefined transfer function includes providing at least one of (i) a non-linear correlation and (ii) a linear correlation between the determined input duty cycle and the output duty cycle.

5. The method according to claim 3, wherein determining the output duty cycle includes:
   determining that the determined input duty cycle falls within a first region of the transfer function, in which the output duty cycle is 0%, if the determined input duty cycle is lower than a
   low duty cycle threshold; determining that the determined input duty cycle falls within a second region of the transfer function, in which the output duty cycle is 100%, if the determined input duty cycle is higher than a high duty cycle threshold; and determining that the determined input duty cycle falls within a third region of the transfer function defined between the first region and the second region, in which the output duty cycle is correlated to the determined input duty cycle, if the determined input duty cycle is between the low duty cycle threshold and the high duty cycle threshold.

6. The method according to claim 1, wherein the first operating frequency is higher than the second operating frequency.

7. The method according to claim 1, wherein:
   the first operating frequency is higher than 15 kHz; and
   the second operating frequency is lower than 5 kHz.

8. The method according to claim 1, further comprising determining at least one of (i) a transition of the output frequency from the first operating frequency to the second operating frequency and (ii) a transition of the output frequency from the second operating frequency to the first operating frequency via at least one predefined hysteresis function.

9. The method according to claim 1, wherein the at least one predefined output duty cycle threshold is defined between a lower duty cycle value of 55% and a higher duty cycle value of 75%.

10. The method according to claim 1, wherein the method is performed at least one of continuously and uninterrupted during an operation of the brushed direct current electric motor.

11. The method according to claim 1, wherein:
    the input signal is a controller area network (CAN) input message; and the output duty cycle is determined based on an input command of the CAN input message.

12. The method according to claim 1, wherein:
    the input signal is a local interconnect network (LIN) input message; and the output duty cycle is determined based on an input command of the LIN input message.

13. The method according to claim 1, wherein:
    the first operating frequency is substantially 20 kHz;
    the second operating frequency is substantially 1 kHz; and
    the at least one predefined output duty cycle threshold is defined between a lower duty cycle value of 60% and a higher duty cycle value of 70%.

14. A device, comprising:
    a control unit; a brushed direct current electric motor controllable via the control unit; the control unit electrically connected to and operatively connected to the brushed direct current electric motor such that the brushed direct current electric motor is drivable via a pulse width modulated output signal generated by the control unit; and wherein the control unit is configured to:

receive a pulse width modulated input signal indicating at least one of (i) a requested rotational speed of the brushed direct current electric motor and (ii) a requested output motor voltage to drive the brushed direct current electric motor; determine an input duty cycle of the received pulse width modulated input signal; determine an output duty cycle depending on the received pulse width modulated input signal via applying a predefined transfer function to the determined input duty cycle of the pulse width modulated input signal; determine an output frequency depending on the determined output duty cycle; generate the pulse width modulated output signal having the determined output duty cycle and the determined output frequency; and drive the brushed direct current electric motor via the generated pulse width modulated output signal.

15. A method for operating a brushed direct current electric motor, comprising: receiving an input signal indicating at least one of (i) a requested rotational speed of the brushed direct current electric motor and (ii) a requested output motor voltage to drive the brushed direct current electric motor; determining an output duty cycle depending on the received input signal; determining an output frequency depending on the determined output duty cycle; generating a pulse width modulated output signal with the determined output duty cycle and the determined output frequency to drive the brushed direct current electric motor; and driving the brushed direct current electric motor via the generated pulse width modulated output signal; wherein determining the output frequency includes comparing the determined output duty cycle with at least one predefined output duty cycle threshold region.

* * * * *